United States Patent [19]
Wroblewski

[11] 3,740,001
[45] June 19, 1973

[54] STRIP TAKE-UP THREADING DEVICE

[75] Inventor: Richard J. Wroblewski, Rochester, N.Y.

[73] Assignee: Eastman Kodak Company, Rochester, N.Y.

[22] Filed: May 3, 1971

[21] Appl. No.: 139,494

[52] U.S. Cl. .............. 242/210, 242/74, 242/187, 242/195
[51] Int. Cl. ................ B65h 75/28, B65h 25/04
[58] Field of Search ............. 242/195, 192, 187, 242/210, 197, 198, 186, 57, 701, 76, 74, 74.1, 74.2; 352/157, 158

[56] References Cited
UNITED STATES PATENTS

| | | | |
|---|---|---|---|
| 3,146,316 | 8/1964 | Knoth | 242/210 X |
| 3,506,345 | 4/1970 | Wells | 242/197 UX |
| 3,395,870 | 8/1968 | Klinger | 242/187 |
| 3,606,192 | 9/1971 | Goddard | 242/187 |
| 3,617,012 | 11/1971 | Stark | 242/197 |

Primary Examiner—George F. Mautz
Attorney—W. H. J. Kline and Roger A. Fields

[57] ABSTRACT

A take-up device, adapted to receive a hub on a rotatable support member of such device and to wind strip material onto a hub so received, is provided with a plurality of guide members which are movable to respective threading positions surrounding a received hub for directing strip material against the received hub. One of the guide members is movable to several sensing positions (1) for detecting the presence at the support member of a hub without strip material wound thereon, (2) for detecting the absence of a hub at the support member and (3) for detecting the presence at the support member of a hub with a predetermined length of strip material wound thereon. A control is operatively associated with the sensing guide member and a strip feeding mechanism for preventing strip threading either in the absence of a hub at the support member or should a hub with a predetermined length of strip material wound thereon be received on the support member. Upon threading of strip material onto a received hub, a trailing portion of such material is tensioned; whereupon, a tension sensing mechanism actuates retraction of the guide members other than the sensing guide member from the outermost convolution of strip material wound onto the received hub.

15 Claims, 9 Drawing Figures

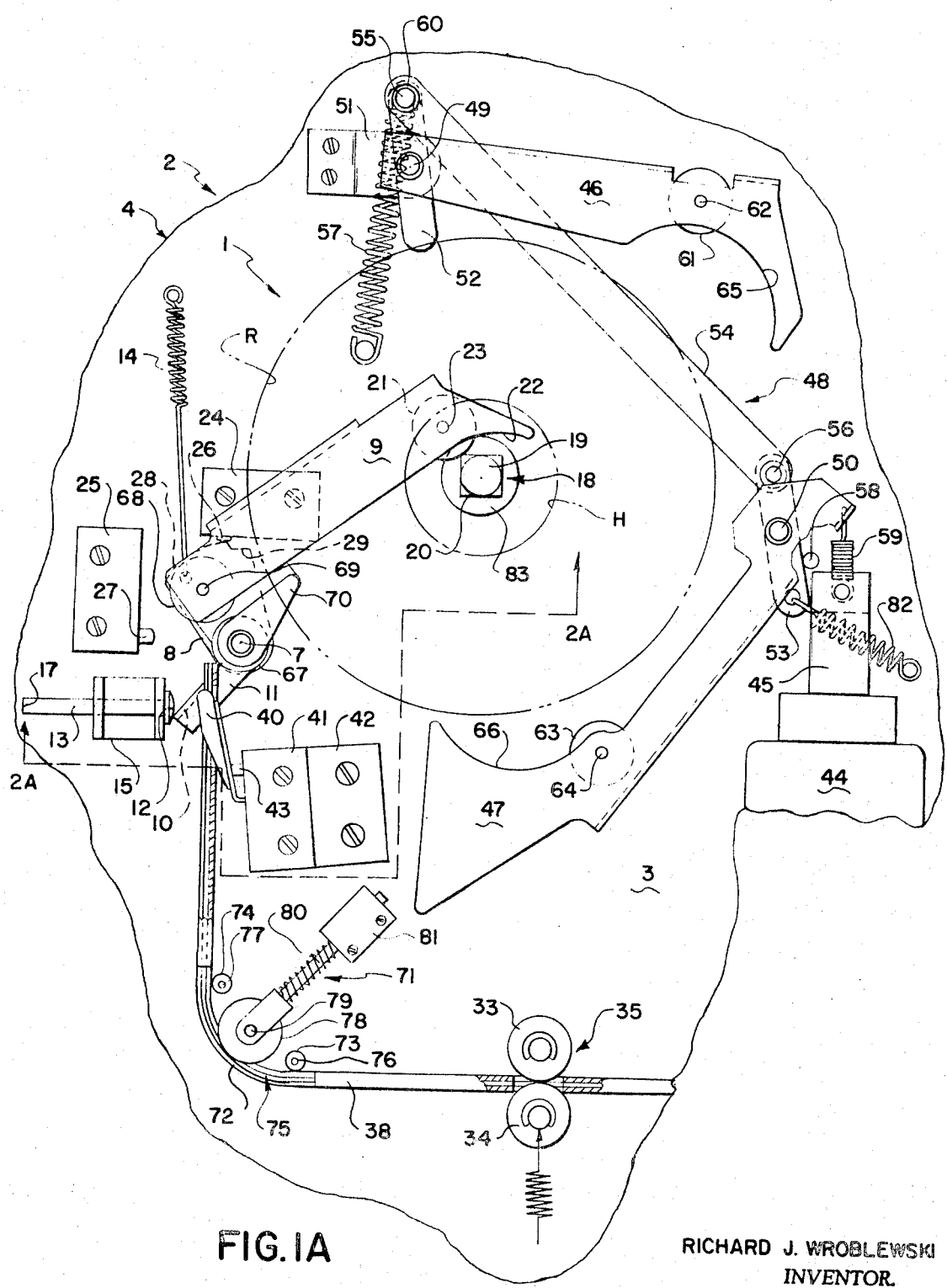
FIG. IA
RICHARD J. WROBLEWSKI
INVENTOR.
BY Roger A. Fields
W.H.J. Kline
ATTORNEYS

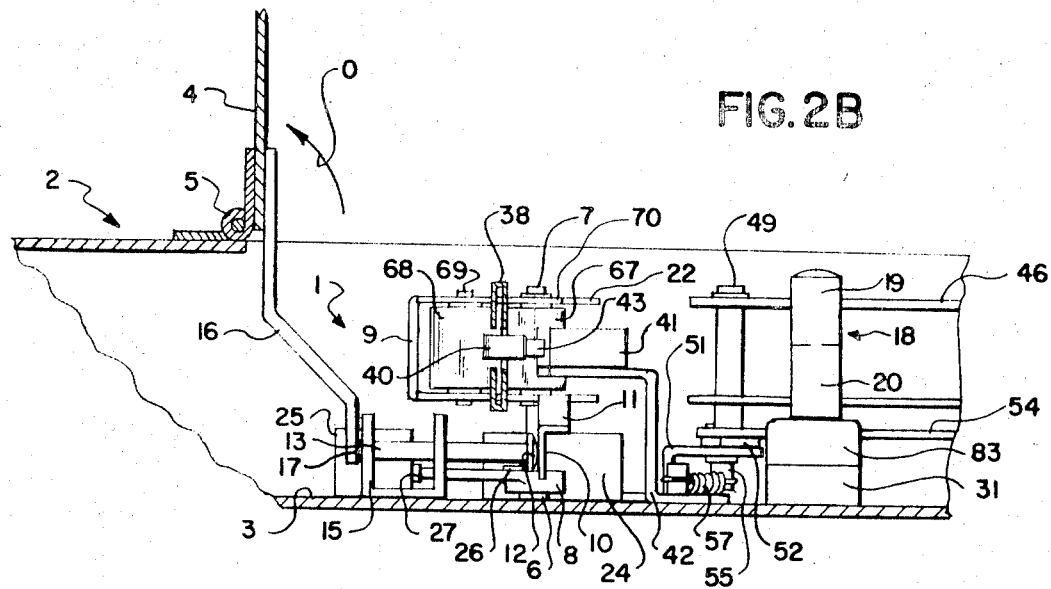
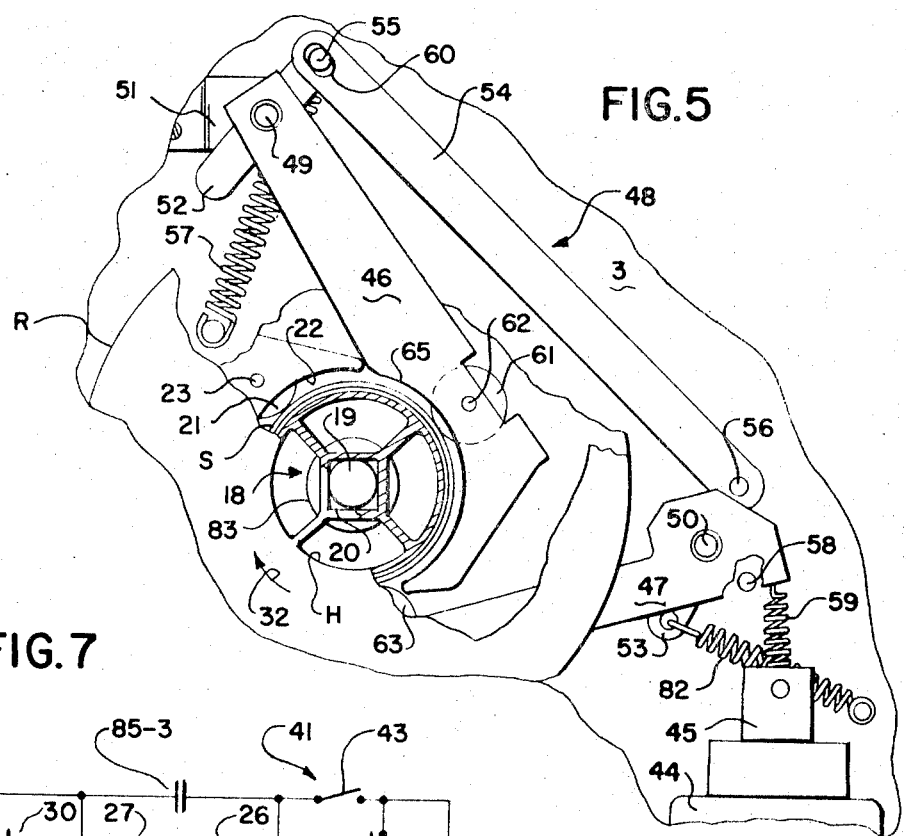
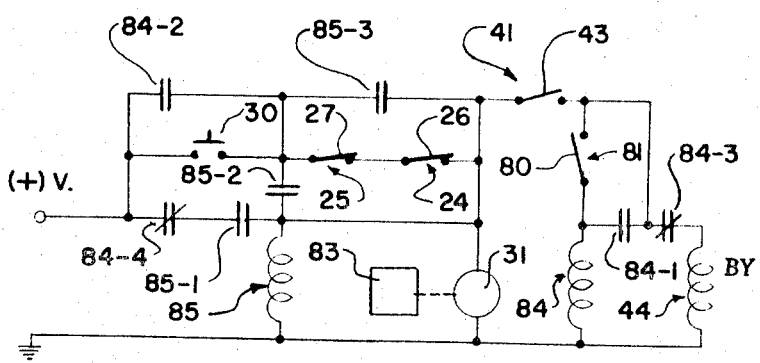

STRIP TAKE-UP THREADING DEVICE

BACKGROUND OF THE INVENTION

1. Field of the Invention

The present invention relates to the winding of strip material to form a convoluted roll and, more particularly, to take-up devices for threading such material onto a hub or a reel.

2. Description of the Prior Art

In certain kinds of strip material handling apparatus, for example motion picture cameras and projectors, take-up reels are provided upon which successive portions of strip material, for example motion picture film, are wound for storage after having passed through a workstation, such as a film gate. With some apparatus of this kind, the operator must manually thread a free leading end portion of the strip material onto the take-up reel. More recently, there has been devised strip material handling apparatus with take-up devices for automatically threading strip material onto a take-up reel.

One such known take-up threading device, disclosed in U.S. Pat. No. 3,395,870, issued on Aug. 6, 1968, is provided with three guide members which are annularly disposed in spaced relation for directing strip material onto a rotatable take-up hub member. The guide members are pivotally supported for movement between respective threading positions, wherein the guide members are spring-urged to abut against the hub member, and respective retracted positions, wherein the guide members ae spaced from the hub member. The guide members in the threading positions are so configured and arranged with respect to each other and the hub member that a free leading end portion of strip material feeding between the guide members and the hub member will be directed tangentially toward and against the hub member. Since the guide members in the threading positions are disposed circumferentially about the hub member, successive portions of the feeding strip material will be looped about the hub member upon rotation of such member in a winding direction. After several convolutions of strip material are wound about the rotating hub member, the wound strip material will establish a hold on and become firmly anchored or snubbed to the rotating hub member.

As the number of convolutions of strip material wound onto the rotating hub member increases, the guide members (now abutted against the outermost strip convolution) are pivoted outwardly away from the hub member until one of the guide members is disposed to open a switch. Opening of the switch effects deenergization of a solenoid (which is in circuit with the switch and is linked to the guide members other than the one guide member); whereupon, the other guide members are moved to their retracted positions spaced from the outermost strip convolution. Conversely, if the one guide member should be moved from its retracted position to its threading position while little or no strip material is wound onto the hub member, then the switch will close and the solenoid will be energized; whereupon, the other guide members are moved to their threading positions.

It can now be appreciated, in view of the previous discussion, that the take-up threading device disclosed in U.S. Pat. No. 3,395,870 operates to determine the presence of several convolutions of strip material wound onto the hub member and, in response thereto, automatically moves two of the three guide members from their threading positions to their retracted positions. Moreover, such device operates upon movement of the one guide member from its retracted position to its threading position to detect the absence of strip material on the hub member and, in response thereto, automatically moves the guide members other than the one guide member from their retracted positions to their threading positions.

While the take-up threading device disclosed in U.S. Pat. No. 3,395,870 appears to represent an improvement over some other previously known devices of a similar nature, such device suffers from a disadvantage (as do the other previously known devices) in that if the hub member should be removed therefrom and the one guide member pivoted inwardly from its retracted position toward the location usually occupied by the removed hub member, then the switch will close and the solenoid will be energized. Upon energization of the solenoid, the guide members other than the one guide member will be moved inwardly past the respective points at which such members normally abut against the hub member. In such way, the guide members may be jammed into engagement with each other, deformed and rendered ineffective for subsequent use.

Moreover, if the hub member should be removed from a take-up threading device of the foregoing kind and a strip feeding mechanism of such device should be actuated before, at the time of, or after movement of the guide members toward the location usually occupied by the removed hub member (or a removed take-up reel), then strip material fed by the actuated mechanism will be advanced to such location. Since the hub member (or a take-up reel) was previously removed, the advanced strip material will form a disorganized mass and may possibly become entangled with the guide members.

Accordingly, it can be seen that a need exists for a take-up threading device of the foregoing kind but which is improved to avoid the above-described disadvantages of devices previously known.

SUMMARY OF THE INVENTION

It is therefore an object of the present invention to provide an improved take-up device for use with strip material.

It is a further object of the present invention to provide a take-up device which cannot be operated for strip threading unless a hub or a reel without strip material wound thereon is present in such device for receiving strip material.

Another important object of the present invention is to provide a take-up device which cannot be operated for strip feeding unless a hub or a reel is present in such device for receiving strip material.

Yet another object of the present invention is to provide a take-up threading device including guide members or snubber members which cannot be actuated for strip threading unless an empty reel is present in such device for receiving strip material.

A further object of the present invention is to provide a take-up threading device including a sensor (1) for detecting the presence of an empty reel at a location in such device for receiving strip material and (2) for detecting the absence of a reel at the strip receiving location.

Yet a further object of the present invention is to provide a take-up threading device including a control for effecting an inoperative mode when an empty hub or an empty reel is not present in such device for receiving strip material.

In accordance with a preferred embodiment of the present invention, there is disclosed hereinafter a take-up threading device adapted to receive a hub on a rotatable support member of such device and to wind strip material onto a hub so received. This device is provided with a plurality of guide members mounted for movement to respective threading positions wherein the guide members are disposed in spaced relation about a received hub for directing strip material onto the received hub. One of the guide members is movable to several sensing positions (1) for detecting the presence at the support member of a hub without strip material wound thereon, (2) for detecting the absence of a hub at the support member and (3) for detecting the presence at the support member of a hub with a predetermined length of strip material wound thereon. A control is operatively associated with the sensing guide member and a strip feeding mechanism for preventing strip threading either in the absence of a hub at the support member or should a hub with a predetermined length of strip material wound thereon be received on the support member. More specifically, in either of the foregoing examples, the control prevents actuation of the feeding mechanism for advancing strip material toward the support member and prevents movement of the guide members other than the sensing guide member to their respective threading positions.

BRIEF DESCRIPTION OF THE DRAWINGS

The above-mentioned and other features and objects of the present invention and the manner of obtaining them will become more apparent by reference to the following detailed description of the preferred embodiment of such invention taken in conjunction with the accompanying drawings wherein:

FIG. 1A is a plan view, partially in section, of a take-up threading device according to a preferred embodiment of the present invention and showing the configuration of three guide arms or members of such device when a take-up reel (illustrated in phantom) is not supported for rotation on a drive spindle of such device;

FIG. 2B is a front elevational view of the take-up threading device as viewed along the line 2B—2B in FIG. 1B;

FIG. 5 is a fragmentary plan view similar to FIG. 4, showing a detail of the linkage interconnecting two of the guide arms for synchronous movement toward and away from a received reel;

FIG. 7 is a schematic diagram of an electrical circuit in the take-up threading device.

DESCRIPTION OF THE PREFERRED EMBODIMENT

Figure 1B:
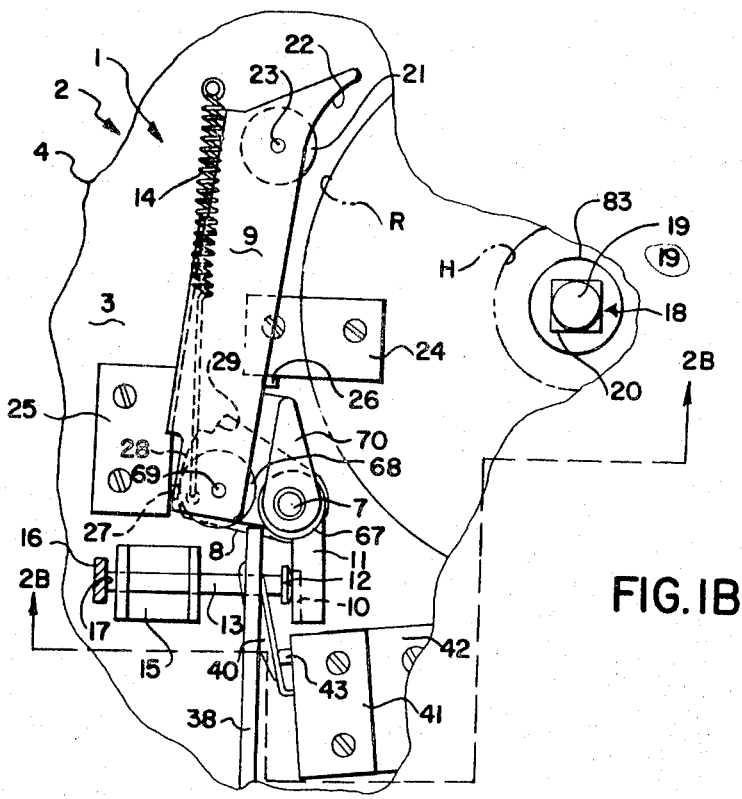
FIG. 1B is a fragmentary plan view similar to FIG. 1A, showing the position of one of the guide arms preparatory to the receipt of a take-up reel (illustrated in phantom) on the drive spindle.
Figure 2A:
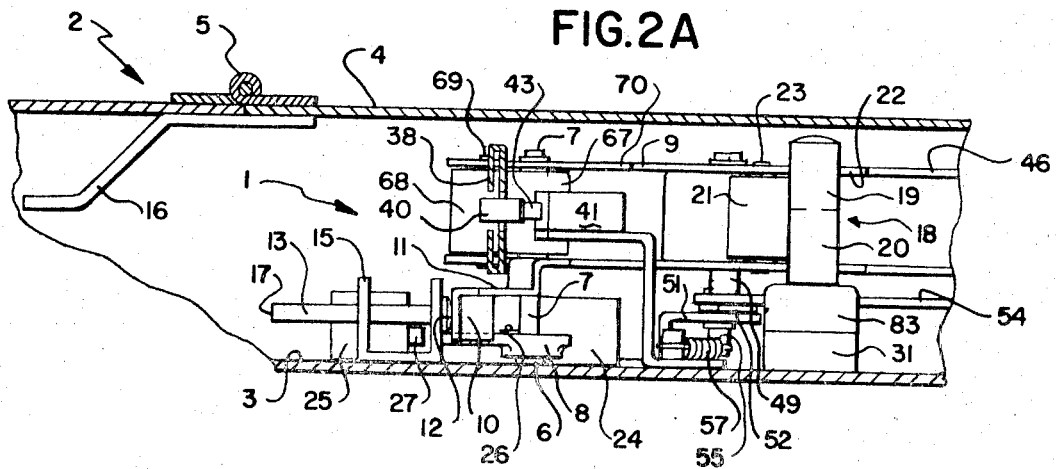
FIG. 2A is a front elevational view of the take-up threading device as viewed along the line 2A—2A in FIG. 1A.

Referring now to FIGS. 1A and 2A of the drawings, there is shown a take-up threading device generally indicated by the reference numeral 1 and which, for the purpose of illustrating several features of the present invention, is located within a portion or a section 2 of a lighttight housing. The remainder of the housing, other than the foregoing section 2, is not of interest with respect to the details of the preferred embodiment described below, and for that reason a disclosure of the remainder of the housing has been omitted. However, by way of background the housing is of the kind for use with a camera (not shown) or other device adapted to receive light sensitive strip material. As shown in FIG. 2A, the housing section 2 is provided with a base 3, on which the take-up device 1 is mounted, and with an overhead door 4. Moreover, a hinge 5 pivotally connects the housing door 4 to the housing section 2 so as to permit the housing door to be opened for access to the take-up device 1.

Figure 3:
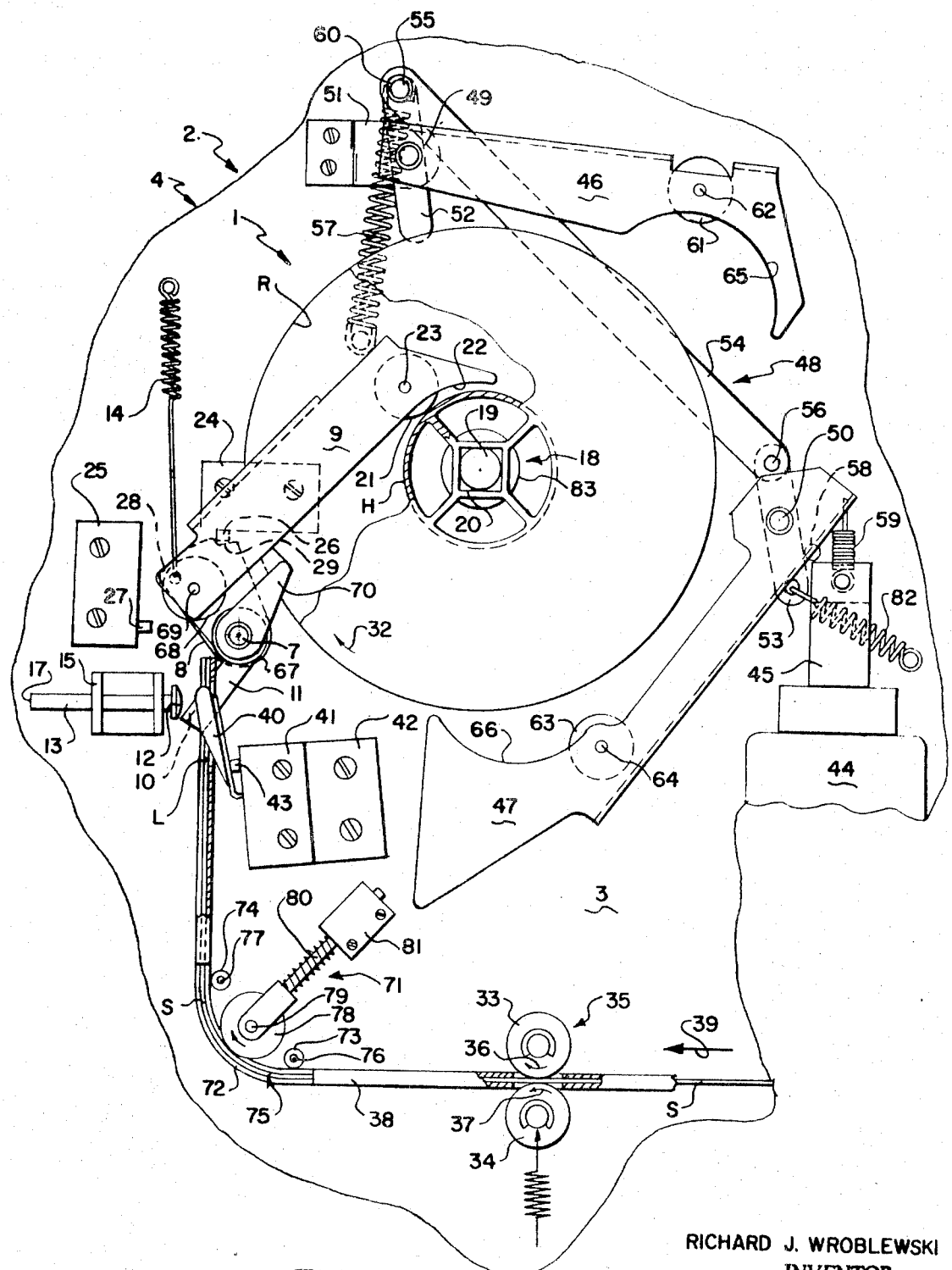
FIG. 3 is a plan view similar to FIG. 1A, showing the configuration of the guide arms when an empty reel is received on the drive spindle.

Considering now in particular the details of the takeup device 1 as viewed in FIG. 2A, there is shown an upright bearing 6 which is mounted on the housing base 3 so as to rotatably support a vertically disposed shaft 7. A cam plate 8 and a first guide arm 9 of the take-up device 1 are connected to the shaft 7 for synchronous rotation therewith. A lip member 10, depending from an elongate extension 11 of the guide arm 9, is continually urged against the head 12 of a pin 13 by a helical tension spring 14. The spring 14 interconnects the housing base 3 and the guide arm 9 in the manner shown by FIG. 1A. The pin 13 is supported for sliding reciprocating movement by a bracket 15 which is mounted on the housing base 3. Accordingly, as the housing door 4 is opened by an operator (not shown), a plate-like extension 16 of the housing door will be pivoted into abutment against a free end 17 of the pin 13. Further movement of the housing door 4 in an opening direction, generally indicated by the arrow O in FIG. 2B, will induce the pin 13 to move from a retracted position, as shown in FIGS. 1A and 2A, to an extended position, as shown in FIGS. 1B and 2B. In such way, the cam plate 8 and the guide arm 9 will be pivoted, against the urging of the spring 14, away from a take-up spindle assembly 18 of the takeup device 1. As can best been seen in FIG. 1B, when the pin 13 is fully extended (and the housing door 4 is completely opened), the guide arm 9 will be disposed to provide sufficient clearance for a take-up reel R to be inserted onto (or removed from) a cylindrical portion 19 and a rectangular driving portion 20 of the spindle assembly 18. Thereafter, as the housing door 4 is closed, the pin 13 will be permitted to move from its extended position to its retracted position and the force of the spring 14 exerted on the guide arm 9 will, in turn, pivot the cam plate 8 and the guide arm in a clockwise direction as viewed in FIG. 1B. When the extension 16 of the housing door 4 is pivoted out of the path of movement of the free pin end 17 by the closing movement of the housing door, the spring 14 will induce the pin 13 to move to its retracted position as shown in FIG. 2A. Simultaneous with the arrival of the pin 13 at its retracted position, if a take-up reel R is not supported on the spindle assembly 18, the cam plate 8 and the guide arm 9 will come to rest at respective locations as shown in FIGS. 1A and 2A. In these locations, an idler roller 21, supported adjacent a curved edge portion 22 of the guide arm 9 by a pin connection 23, will abut against the rectangular portion 20 of the spindle assembly 18. Alternatively, if a take-up reel R without strip material wound thereon, i.e. an empty reel, should be supported on the spindle assembly 18, then, upon closing the housing door 4, the cam plate 8 and the guide arm 9 will come to rest at respective locations as shown in FIG. 3. In these locations, the idler roller 21 will abut against a hub member H of the empty reel R.

First and second normally closed, "no go," switches 24 and 25 of the take-up device 1 are mounted on the housing base 3 so as to be located in spaced relation along the path of movement of the cam plate 8, see FIGS. 1A and 2A. These switches are of the kind respectively provided with depressible switch elements 26 and 27 which, when individually depressed, open a respective switch so as to effect a "no go" mode at certain stages in the operational cycle of the take-up device 1. The meaning of the term "no go" as it applies to the take-up device 1 will become apparent on considering a detailed description hereinafter of the electrical circuit shown in FIG. 7.

As can be seen in FIGS. 1B and 2B, the cam plate 8 includes a camming surface or plate edge 28 which is disposed to depress the switch element 27 (but which is spaced from the switch element 26) when the housing door 4 is opened. Conversely, when the housing door 4 is closed and the idler roller 21 on the first guide arm 9 is abutted against the rectangular portion 20 of the take-up spindle assembly 18, as in the above-described example shown by FIGS. 1A and 2A, the cam plate edge 28 is disposed to depress the switch element 26 (but is spaced from the switch element 27). Moreover, when the housing door 4 is closed and the idler roller 21 is abutted against the hub member H of an empty reel R, as in the above-described example shown by FIG. 3, the cam plate edge 28 is spaced from each of the switch elements 26 and 27. With respect to the last-mentioned example, a relieved portion 29 of the cam plate edge 28 serves to space the cam plate edge from the switch element 26.

Figure 6:
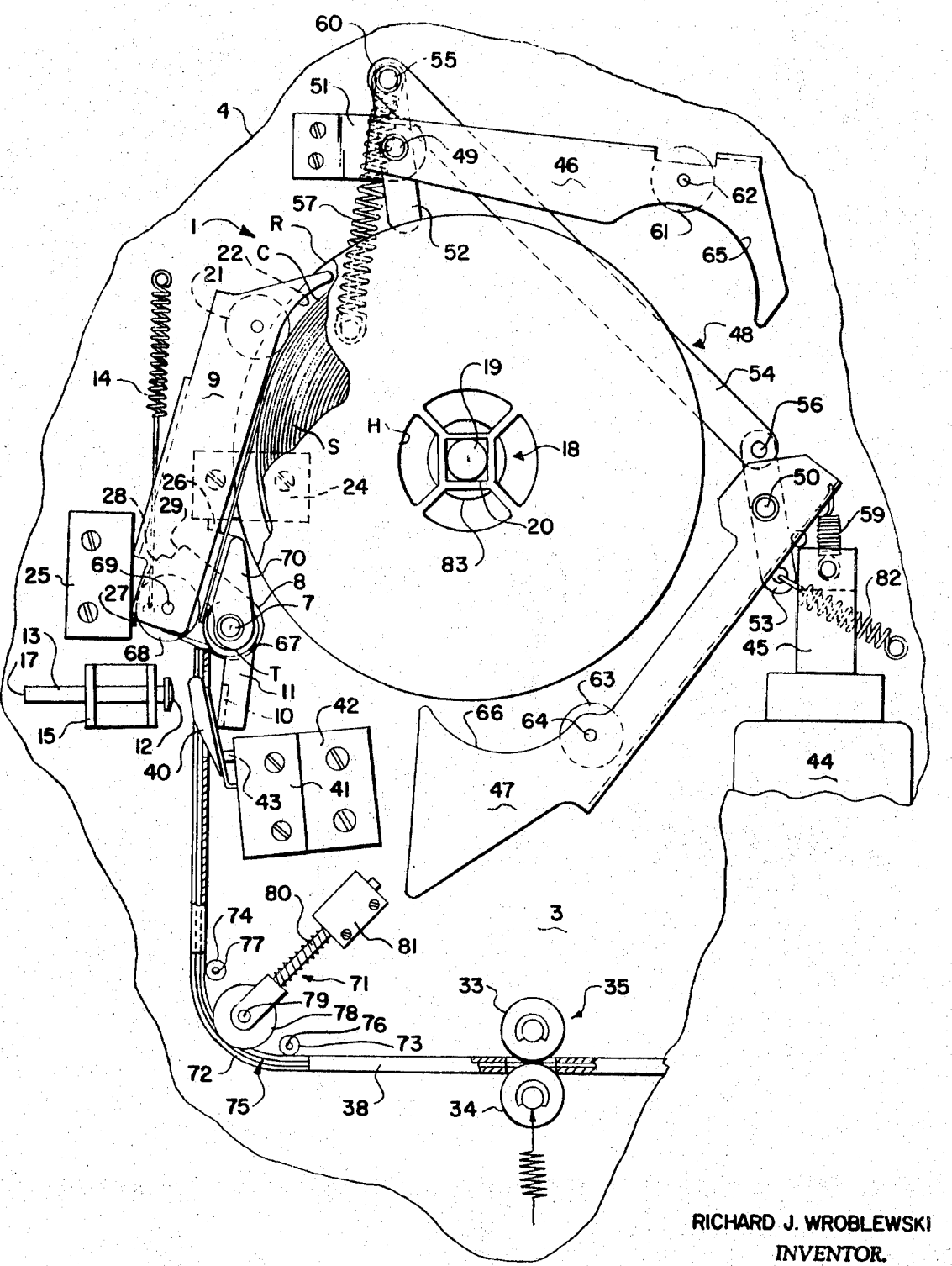
FIG. 6 is a plan view similar to FIG. 4, showing the configuration of the guide arms when strip material is fully wound onto a received reel.

With reference to the example shown in FIG. 6 it can be seen that if a reel R, on which a full complement of strip material S has been wound, should be supported on the spindle assembly 18, then, upon closing the housing door 4, the cam plate 8 and the guide arm 9 will come to rest at respective locations wherein the idler roller 21 is abutted against the outermost strip convolution C. In these locations, the cam plate edge 28 is disposed to depress the switch element 27 (but is spaced from the switch element 26).

It can now be appreciated that the cam plate 8 will be disposed to open the first switch 24 (but not the second switch 25) when the idler roller 21 on the first guide arm 9 is abutted against the rectangular portion 20 of the take-up spindle assembly 18 (see FIG. 1A). Moreover, the cam plate 8 will be disposed to open the second switch 25 (but not the first switch 24) when either the housing door 4 is opened (see FIG. 1B) or a reel R, on which a full complement of strip material S has been wound, is supported on the spindle assembly 18 and the idler roller 21 is abutted against the outermost strip convolution C (see FIG. 6). It is to be further appreciated that the first and second switches 24 and 25 will be closed when the housing door 4 is closed and an empty reel R is supported on the spindle assembly 18 (see FIG. 3). In the last-mentioned example, the switches 24 and 25 will effect a "go" mode for the take-up device 1. The meaning of the term "go" as it applies to the take-up device 1 will become apparent on considering a detailed description hereinafter of the electrical circuit shown in FIG. 7.

Considering now a typical sequence of operation for the take-up device 1 in which it is assumed that an operator (not shown) has placed an empty reel R on the spindle assembly 18 and has closed the housing door 4 so that, as viewed in FIG. 3, the first and second switches 24 and 25 are closed and the idler roller 21 on the first guide arm 9 is abutted against the reel hub H. Upon manually closing a normally opened start switch 30 (see FIG. 7) which is preferably located on a control board (not shown), a drive motor 31 in electrical circuit with the start switch (see FIGS. 2A and 7) will be energized to rotate the spindle assembly 18 and the empty reel R in a winding direction, generally indicated by the arrow 32, as shown in FIG. 3. Moreover, the drive motor 31, when energized, serves to rotate a drive roller 33 and a pressure idler roller 34 of a strip feeding or advancing assembly 35. These rollers 33 and 34 are rotated in opposite directions, generally indicated by the arrows 36 and 37, as shown in FIG. 3 and are supported above the housing base 3 by a suitable bracket (not shown). Accordingly, if strip material S is advanced off a supply reel (not shown) and into a guide track 38 which is likewise supported above the housing base 3 at the same elevation as the strip feeding assembly 35, the strip material will be directed between the drive roller 33 and the pressure idler roller 34. In such way, the strip material S will be advanced along the guide track 38 in a downstream direction, generally indicated by the arrow 39, as shown in FIG. 3.

Figure 4:
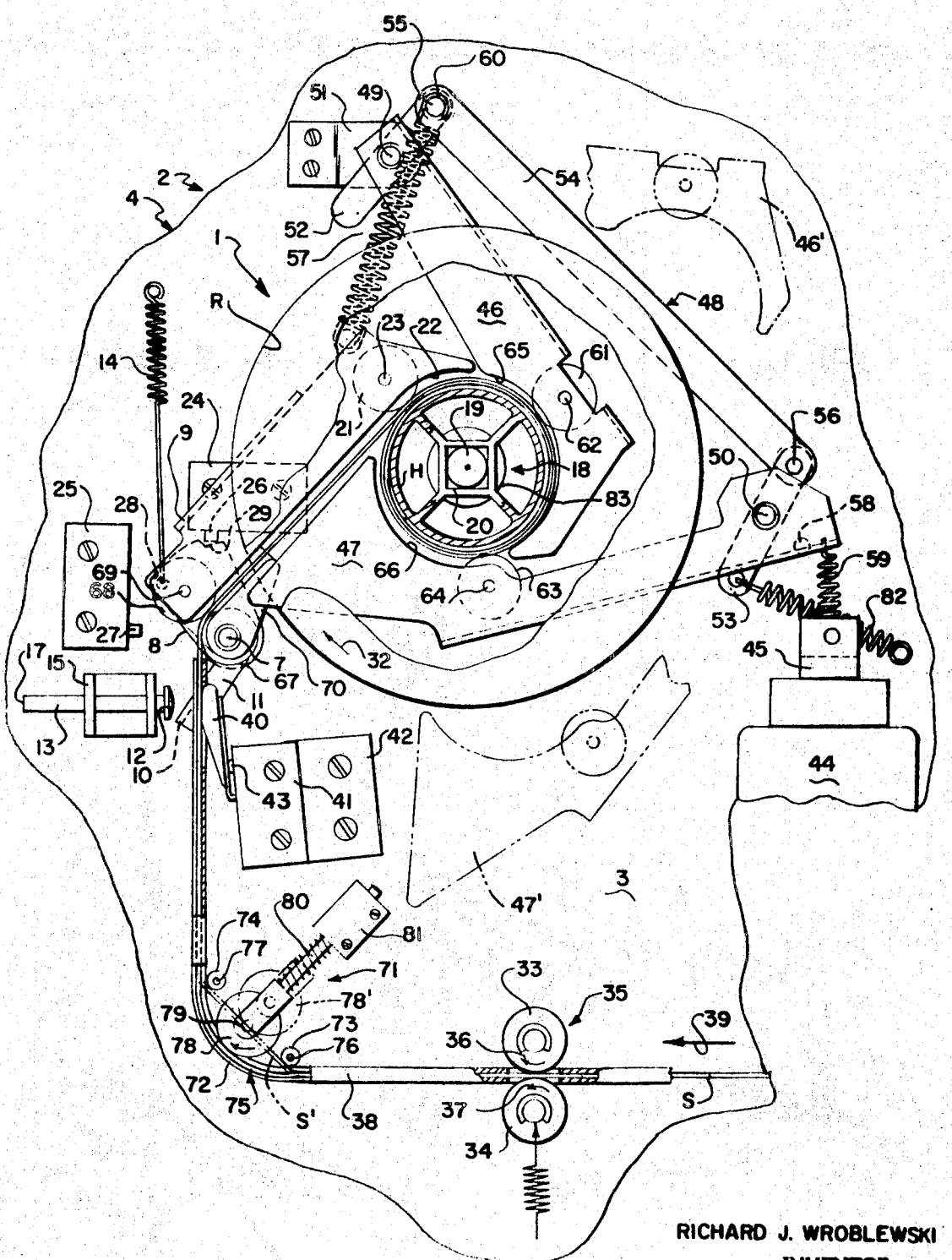
FIG. 4 is a plan view similar to FIG. 3, showing the configuration of the guide arms while a free leading end portion of strip material is winding about the hub member of a received reel, and showing the configuration of the guide arms (two of which are illustrated in phantom) after the wound strip material is cinched or snubbed to the hub member of the received reel.

Disposed across the guide track 38 at a location downstream from the strip feeding assembly 35, there is shown in FIG. 3 a flexible finger member 40 which is connected to a normally opened strip sensing switch 41. This switch 41 is supported above the housing base 3, at the same elevation as the guide track 38, by a bracket 42 which is mounted on the housing base (see FIG. 2A). As can be seen in FIGS. 3 and 4, when a free leading end portion L of the strip material S is advanced against the finger member 40 by the strip feeding assembly 35, the finger member will pivot in a clockwise direction and depress a switch element 43 of the switch 41 so as to close the switch. Closing of the switch 41 in the foregoing manner, serves to energize a solenoid 44 which, in turn, serves to retract a plunger member 45 of the solenoid; whereupon, a second guide arm 46 and a third guide arm 47 of the take-up device 1 will be moved from respective retracted positions, as shown in FIG. 3, to respective threading positions, as shown in FIG. 4, by a linkage assembly 48 interconnecting the plunger member 45 and the second and third guide arms.

Briefly considering the linkage assembly 48, there is shown in FIG. 3 first and second rotatable shaft members 49 and 50 which extend in parallel spaced relation along axes of rotation respectively perpendicular to the housing base 3. The first shaft member 49 is rotatably supported above the housing base 3 by a bearing-bracket member 51 which is mounted on and extends from the housing base in the manner shown by FIG. 2A. The second shaft 49 is rotatably supported at the housing base 3 by a suitable bearing member (not shown) which is mounted on the housing base. The second guide arm 46 and a first link member 52 are supported in spaced relation on the first shaft member 49 for synchronous rotation therewith. The third guide arm 47 and a second link member 53 are supported in spaced relation on the second shaft member 50 for synchronous rotation therewith. A third link member 54 interconnects the first and second link members 52 and 53 respectively at pivot studs 55 and 56. The foregoing members of the linkage assembly 48 and the second and third guide arms 46 and 47 are biased to a configuration, as viewed in FIG. 3, when the solenoid 44 is de-energized. This configuration is effected by an overcenter helical tension spring 57, interconnecting the housing base 3 and the pivot stud 55, and a helical compression spring 82, interconnecting the second link member 53 and the housing base. A stop pin 58 is mounted on the housing base 3 to abut against the second link member 53, and thereby, position the second link member, as viewed in FIG. 3, when the second and third guide arms 46 and 47 are disposed in their respective retracted positions. A helical tension spring 59 interconnects the plunger member 45 of the solenoid 44 and third guide arm 47. Accordingly, upon energization of the solenoid 44 in the above-described manner, the linkage assembly 48 and the second and third guide arms 46 and 47 are moved from the configuration shown in FIG. 3 to the configuration shown in FIG. 4. Conversely, upon deenergization of the solenoid 44 in a manner to be described hereinafter, the linkage assembly 48 and the second and third guide arms 46 and 47 are moved from the configuration shown in FIG. 4 to the configuration shown in FIG. 3.

Referring again to the operational sequence of the take-up device 1, it can be seen in FIG. 4 that when the first, second and third guide arms 9, 46 and 47 are disposed in their respective threading positions, the idler roller 21 (on the first guide arm), an idler roller 61 (which is supported on the second guide arm by a pin connection 62) and an idler roller 63 (which is supported on the third guide arm by a pin connection 64) will be equally spaced about the reel hub H in abutting relation therewith. Moreover, the curved edge portion 22 of the first guide arm 9, a curved edge portion 65 of the second guide arm 46 and a curved edge portion 66 of the third guide arm 47 will cooperate to define a substantially closed chamber about the reel hub H. It can now be appreciated that if the strip material S should first be advanced by the strip feeding assembly 35 between spaced idler rollers 67 and 68 (which are respectively supported on the first guide arm 9 by the shaft 7 and a pin connection 69) and thereafter advanced between the first guide arm and a guide finger 70 (which is supported on the first guide arm in fixed, spaced, parallel relation therewith by the shaft 7), then, the strip material will be directed tangentially toward and against the reel hub H in the manner shown by FIG. 4. Since the reel R is rotating with the take-up spindle assembly 18 in the winding direction, generally indicated by the arrow 32, successive portions of the strip material S will be looped about the reel hub H to form a strip convolution. After several convolutions of the strip material S are wound about the reel hub H, the wound strip material will establish a hold on and become firmly anchored or snubbed to the reel hub.

As can best be seen in FIG. 5, the third link member 54 of the linkage assembly 48 is provided with a clearance slot 60 in which the pivot stud 56 is movably seated. When the second and third guide arms 46 and 47 and the linkage assembly 48 are disposed in the configuration shown in FIGS. 4 and 5, the clearance slot 60 serves to permit a slight movement of the linkage assembly relative to the reel R on the take-up spindle assembly 18, so that the springs 57 and 82 can urge the idler roller 61 (on the second guide arm 46) and the idler roller 63 (on the third guide arm 47) firmly against the reel hub H.

A strip tension sensing assembly 71 of the take-up device 1, as shown in FIG. 4, is disposed adjacent an arcuate portion 72 of the guide track 38. This assembly 71 is provided with a pair of spaced idler rollers 73 and 74 which are respectively supported adjacent the opposite ends of an opening 75 in the guide track 38 by pin connections 76 and 77 (attached to the guide track). The idler rollers 73 and 74 are located alongside the guide track opening 75 so as to be slightly spaced from the strip material S moving in the guide track 38. An idler roller 78 is supported by a pin connection 79 on a depressible switch element 80 of a normally opened strip tension sensing switch 81. This switch 81 is mounted above the housing base 3, at the same elevation as the guide track 38, by a suitable bracket (not shown) so that the idler roller 78 is slightly spaced from the strip material S moving through the arcuate portion 72 of the guide track (see FIG. 4). Accordingly, upon snubbing of the strip material S to the hub member H of the take-up reel R in the above-described manner, the portion of the strip material, extending in the guide track 38 between the reel hub H and the strip feeding assembly 35, will be abruptly tensioned. Whereupon, as shown in FIG. 4, a strip section S' will move out of the guide track opening 74 in response to such tensioning and will come to rest against the idler rollers 73 and 74. In such way, the idler roller 78 will be moved to a retracted position (as shown by the idler roller 78' in FIG. 4) and the switch 81 will be closed.

Moreover, as will become apparent on considering a detailed description hereinafter of the electrical circuit shown in FIG. 7, upon closing the strip tension sensing switch 81, the solenoid 44 will be deenergized so as to move the plunger member 45 thereof to a normally extended position (as viewed in FIG. 6). Accordingly, the second and third guide arms 46 and 47 will be moved from their respective threading positions to their respective retracted positions (as shown by the second and third guide arms 46' and 47' in FIG. 4) and, simultaneously therewith, the linkage assembly 48 will be moved from the configuration shown in FIG. 4 to the configuration shown in FIG. 6.

After the second and third guide arms 46 and 47 are moved from their respective threading positions shown in FIG. 4 their respective retracted to their respective retracted positions shown in FIG. 5 and as successive convolutions of the strip material S are wound onto the hub member H of the take-up reel R, the idler roller 21 on the first guide arm 9 will continue to ride on the outermost strip convolution so that the first guide arm will be incrementally pivoted outwardly as each successive strip convolution is formed. As viewed in FIG. 2A, a gear and clutch mechanism 83 (the details of which are generally known) is located between the take-up spindle assembly 18 and the drive roller 31. This mechanism 83 is adapted to slip at a predetermined torque so that the tension in the strip material S, extending between the take-up reel R and a supply reel (not shown), permits the take-up reel to be rotated by the drive motor 34 only as fast as dictated by the corresponding drive motor (not shown) which effects the unwinding rotation of the supply reel.

With reference to FIGS. 4 and 6, it can be seen that when a trailing end portion T of the strip material S is advanced in the downstream direction, generally indicated by the arrow 39, past the strip feeding assembly 35, the strip material will no longer be tensioned between the reel hub H and the strip feeding assembly. Whereupon, the idler roller 78 will move from the retracted position (as shown by the idler roller 78' in FIG. 4) to a normally extended position (as shown by the idler roller 78 in FIG. 4) and, simultaneously therewith, the strip tension sensing switch 81 will open. At this time, as will become apparent on considering a detailed description hereinafter of the electrical circuit shown in FIG. 7, the solenoid 44 remains deenergized. Moreover, when a full complement of the strip material S has been wound onto the take-up reel R, as shown in FIG. 6, and the switch element 27 has been depressed by the cam plate edge 28 so as to open the second "no go" switch 25, the drive motor 31 will not be deenergized.

When the trailing end portion T of the strip material S is drawn past the finger member 40 of the strip sensing switch 41 by the winding rotation of the reel hub H, as shown in FIG. 6, the strip sensing switch will open and the drive motor 31 will be deenergized in accordance with the electrical circuit shown in FIG. 7. Upon deenergization of the drive motor 31, the take-up reel R will come to rest. Thereafter, the operator (not shown) may open the housing door 4 and remove the take-up reel R and the strip material S. However, should the operator forget to remove the take-up reel R on which is wound a full complement of the strip material S and, believing an empty reel R is supported on the spindle assembly 18, manually depress the start switch 30, then, as will become apparent on considering the electrical circuit shown in FIG. 7, the take-up device 1 will be prevented from effecting a "go" mode for beginning the operational sequence just described.

Considering now the electrical circuit of the take-up device 1, there is shown in FIG. 7 a first relay 84 and a second relay 85. The first relay 84 is provided with normally opened switch contacts 84-1 and 84-2 and with normally closed switch contacts 84-3 and 84-4. The second relay 85 is provided with normally opened switch contacts 85-1, 85-2 and 85-3. Moreover, there is shown in FIG. 7 the normally opened start switch 30, the normally closed first and second "no go" switches 24 and 25, the normally opened strip sensing switch 41, the normally opened strip tension sensing switch 81, the solenoid 44 and the drive motor 34. To facilitate an understanding of the electrical circuit as it applies to a typical sequence of operation for the take-up device 1, there is provided below a "truth table" which shows the mode of the electrical circuit at each operational step.

The "truth table" should be read one column at a time, beginning with the step "0".

TRUTH TABLE

| Sequential steps | 0 | 1 | 2 | 3 | 4 | 5 | 6 | 7 | 8 | 2' | 3' | 2" | 3" |
|---|---|---|---|---|---|---|---|---|---|---|---|---|---|
| Housing door 4 | c | O | c | c | c | c | c | c | c | C | c | C | c |
| First switch 24 | c | c | c | c | * | * | * | * | * | c | c | o | o |
| Second switch 25 | c | o | c | c | * | * | * | * | * | c | c | o | o |
| Start switch 30 | o | o | o | C | O | o | o | o | o | o | o | o | o |
| First relay 84 | de | de | de | de | de | de | e | e | e | de | de | de | de |
| Switch contact 84-1 | o | o | o | o | o | o | c | c | c | o | o | o | o |
| Switch contact 84-2 | o | o | o | o | o | o | c | c | c | o | o | o | o |
| Switch contact 84-3 | c | c | c | c | c | c | o | o | c | c | c | c | c |
| Switch contact 84-4 | c | c | c | c | c | c | o | o | c | c | c | c | c |
| Second relay 85 | de | de | de | e | e | e | e | e | de | de | de | de | de |
| Switch contact 85-1 | o | o | o | c | c | c | c | c | o | o | o | o | o |
| Switch contact 85-2 | o | o | o | c | c | c | c | c | o | o | o | o | o |
| Switch contact 85-3 | o | o | o | c | c | c | c | c | o | o | o | o | o |
| Solenoid 44 | de | de | de | de | de | e | de | de | de | de | de | de | de |
| Strip sensing switch 41 | o | o | o | o | o | C | c | c | O | o | o | o | o |
| Strip tension sensing switch 81 | o | o | o | o | o | o | C | O | o | o | o | o | o |
| Motor 31 | de | de | de | e | e | e | e | e | de | de | de | de | de |

Legend:

Capitalized letter indicates the item initiating a particular sequential step.
  o indicates "open".
  c indicates "closed".
  de indicates "deenergized".
  e indicates "energized".
  * indicates "don't care".

In the foregoing "truth table" steps 2-8 characterize the above-described example wherein the operator has placed an empty reel R on the take-up spindle assembly 18 and has closed the housing door 4 (see FIG. 3), steps 2' and 3' characterize the above-described example wherein the operator has closed the housing door without first placing a reel on the take-up spindle assembly (see FIG. 1A), and steps 2" and 3" characterize the above-described example wherein a reel with a full complement of strip material S is supported on the take-up spindle assembly and the operator has closed the housing door (FIG. 6).

It will now be appreciated by those having ordinary skill in the art that the take-up device 1 can be operated (1) to detect the presence of an empty reel R at the spindle assembly 18, (2) to detect the absence of a reel at the spindle assembly and (3) to detect the presence of a reel with a full complement of strip material S at the spindle assembly. Moreover, the take-up device 1 is prevented from effecting a "go" or operative mode to begin strip feeding and strip threading unless an empty reel R is supported on the spindle assembly 18. That is to say, a "no go" or inoperative mode will be effected if the take-up device 1 should detect either the absence of a reel R at the spindle assembly 18 or the presence of a reel with a full complement of strip material S at the spindle assembly.

Although the take-up device 1 has been considered hereinbefore for use with light sensitive strip material, it will of course be appreciated that such device can be similarly used with other kinds of strip material.

The present invention has been described in considerable detail with particular reference to a preferred embodiment thereof, but it will be understood that variations and modifications can be effected within the scope and spirit of such invention.

I claim:

1. In a take-up device which is adapted for use with a reel of the kind having a hub member about which strip material can be wound and which is adapted to receive such a reel on a rotatable support member of such device and to wind strip material onto a reel so received, the combination comprising:

sensor means (1) for detecting the presence at the support member of a reel without strip material wound thereon and (2) for detecting the absence of a reel at the support member;

said sensing means including a detecting member and means mounting said detecting member (1) for movement into abutting relation with the hub member of a reel without strip material wound thereon to detect the presence of that reel at the support member of the take-up device and (2) for movement alongside the support member to detect the absence of a reel at the support member; and control means (1) for effecting a first mode in response to said sensor means detecting the presence at the support member of a reel without strip material wound thereon and (2) for effecting a second mode in response to said sensor means detecting the absence of a reel at the support member;

said control means including means for preventing operation of the take-up device upon the effecting of said second mode and for permitting operation of the take-up device upon the effecting of said first mode.

2. The combination as recited in claim 1, wherein the take-up device is provided with a guide path between a reel received on the support member and a location spaced therefrom and with a first drive mechanism actuatable for feeding strip material along the guide path toward a reel so received, and wherein said control means further includes:

means for actuating the first drive mechanism upon said control means effecting said first mode.

3. The combination as recited in claim 2, wherein the take-up device is provided with a second drive mechanism actuatable for rotating the support member and a reel received thereon in a winding direction, and wherein said control means further includes:

means for actuating the second drive mechanism upon said control means effecting said first mode.

4. In a take-up device which is adapted for use with a reel of the kind having a hub member about which strip material can be wound in a convoluted roll and which is adapted to receive such a reel on a rotatable support member of such device and to wind strip material onto a reel so received, the combination comprising:

sensor means (1) for detecting the presence at the support member of a reel without strip material wound thereon, (2) for detecting the absence of a reel at the support member and (3) for detecting the presence at the support member of a reel with a length of strip material wound thereon;

said sensor means including a detecting member and means mounting said detecting member (1) for movement into abutting relation with the hub member of a reel without strip material wound thereon to detect the presence of that reel at the support member of the take-up device, (2) for movement along-side the support member to detect the absence of a reel at the support member, and (3) for movement into abutting relation with the outermost convolution of a length of strip material wound onto a reel to detect the presence of that reel at the support member; and control means (1) for effecting a first mode in response to said sensor means detecting the presence at the support member of a reel without strip material wound thereon, (2) for effecting a second mode in response to said sensor means detecting the absence of a reel at the support member and (3) for effecting said second mode in response to said sensor means detecting the presence at the support member of a reel with a length of strip material wound thereon;

said control means including means for preventing operation of the take-up device upon the effecting of said second mode and for permitting operation of the take-up device upon the effecting of said first mode.

5. The combination as recited in claim 4, wherein said control means further includes:

means for preventing said control means from effecting said second mode in response to said control means effecting said first mode.

6. In a take-up device which is adapted to receive a hub on a rotatable support member of such device and to thread strip material onto a hub so received, the take-up device being provided with a drive mechanism for rotating the support member and a hub received thereon in a winding direction and with a plurality of guide members which are disposed in spaced relation about the support member, the guide members being mounted on the take-up device for movement between threading positions wherein the guide members are oriented to direct strip material onto a received hub and retracted positions wherein the guide members are spaced from the outermost convolution of strip material wound on such hub, the combination comprising:

sensor means (1) for detecting the presence at the support member of a hub without strip material wound thereon and (2) for detecting the absence of a hub at the support member;

said sensor means including one of the guide members and means mounting the one guide member (1) for movement into abutting relation with a hub without strip material wound thereon to detect the presence of that hub at the support member and (2) for movement alongside the support member to detect the absence of a hub at the support member; and control means (1) for effecting a first mode in response to said sensor means detecting the presence at the support member of a hub without strip material wound thereon and (2) for effecting a second mode in response to said sensor means detecting the absence of a hub at the support member;

said control means including means for preventing operation of the take-up device upon the effecting of said second mode and for permitting operation of the take-up device upon the effecting of said first mode.

7. The combination as recited in claim 6, wherein said control means further includes:

electrical circuit means, including a normally closed switch, for effecting said first mode when said switch is closed and for effecting said second mode when said switch is opened, and wherein said sensor means further includes:

a cam member; and means for connecting the one guide member of the take-up device and said cam member in a manner such that said cam member opens said switch upon movement of the one guide member, alongside the support member of the take-up device, to detect the absence of a hub at the support member.

8. The combination as recited in claim 6, wherein said control means further includes:
means for moving the guide members of the take-up device other than the one guide member from the retracted positions to the threading positions in subsequent relation to said control means effecting said first mode.

9. The combination as recited in claim 6, wherein the take-up device is provided with a guide path between a hub received on the support member and a location spaced therefrom and with a strip feed assembly actuatable for advancing strip material along the guide path toward a hub so received, and wherein said control means further includes:
means for actuating the strip feed assembly upon said control means effecting said first mode.

10. The combination as recited in claim 9, wherein said control means further includes:
means for moving the guide members of the take-up device other than the one guide member from the retracted positions to the threading positions; and
means for detecting the presence of strip material advancing along the guide path of the take-up device and, in response thereto, for actuating said moving means.

11. The combination as recited in claim 6, further comprising:
a guide finger;
means for mounting the one guide member of the take-up device and said guide finger in substantially parallel, fixed, spaced relation to enable the passage of strip material between the one guide member and said guide finger; and
means for resiliently urging the one guide member toward the support member of the take-up device.

12. The combination as recited in claim 6, wherein the take-up device is provided with a housing and with a door mounted thereon which can be opened to permit access to such device, and wherein the combination further comprises:
means for coupling the one guide member of the take-up device and the door in a manner such that the one guide member is moved away from the support member of the take-up device upon opening the door;
means for resiliently urging the one guide member toward the support member; and
means for releasing the one guide member from the door, upon closing the door, to enable the one guide member to be moved by said urging means toward the support member.

13. For use with a reel of the kind provided with a hub member about which strip material can be wound in a convoluted roll, apparatus for winding strip material onto such a reel, said apparatus comprising:
means, including a spindle, for removably supporting such a reel for rotation;
means actuatable for rotating said supporting means and a reel supported thereby in a winding direction;
means for defining a guide path between a supported reel and a location spaced therefrom;
means actuatable for feeding strip material along said guide path toward a supported reel;
sensor means (1) for detecting the presence at said spindle of a supported reel without strip material wound thereon and (2) for detecting the absence of a reel at said spindle;
said sensor means including a detecting member and means mounting said detecting member (1) for movement into abutting relation with the hub member of a supported reel without strip material wound thereon to detect the presence of that reel at said spindle and (2) for movement into abutting relation with said spindle to detect the absence of a reel at said spindle; and
control means (1) for actuating said rotating means and said feeding means in response to said sensor means detecting the presence at said spindle of a supported reel without strip material wound thereon and (2) for preventing actuation of said rotating means and said feeding means in response to said sensor means detecting the absence of a reel at said spindle.

14. In a take-up device which is adapted to receive a hub on a rotatable spindle member of such device and to thread strip material onto a hub so received, the take-up device being provided with a drive mechanism for rotating the spindle member and a hub received thereon in a winding direction and with a plurality of guide members which are disposed in spaced relation about the spindle member, the guide members being mounted on the take-up device for movement between threading positions wherein the guide members are oriented to direct strip material onto a received hub and retracted positions wherein the guide members are spaced from the outermost convolution of strip material wound on such hub, the combination comprising:
sensor means (1) for detecting the presence at the spindle member of a hub without strip material wound thereon, (2) for detecting the absence of a hub at the spindle member and (3) for detecting the presence at the spindle member of a hub with a predetermined length of strip material wound thereon;
said sensor means including one of the guide members and means mounting the one guide member (1) for movement into abutting relation with a hub without strip material wound thereon for detecting the presence of that hub at the spindle member, (2) for movement into abutting relation with the spindle member for detecting the absence of a hub at the spindle member and (3) for movement into abutting relation with the outermost convolution of a predetermined length of strip material wound onto a hub for detecting the presence of that hub at the spindle member; and
control means (1) for effecting a first mode in response to said sensor means detecting the presence at the spindle member of a hub without strip material wound thereon, (2) for effecting a second mode in response to said sensor means detecting the absence of a hub at the spindle member and (3) for effecting said second mode in response to said sensor means detecting the presence at the spindle member of a hub with a predetermined length of strip material wound thereon;
said control means including means for preventing operation of the take-up device upon the effecting of said second mode and for permitting operation of the take-up device upon the effecting of said first mode;

said control means further including means for moving the guide members other than the one guide member from the retracted positions to the threading positions in subsequent relation to said control means effecting said first mode.

15. The combination as recited in claim 14, wherein said control means further includes:

electrical circuit means, including a normally closed first switch and a normally closed second switch, for effecting said first mode when said first and second switches are closed and for effecting said second mode when either of said first and second switches is opened, and wherein said sensor means further includes:

a cam member; and means for connecting the one guide member of the take-up device and said first cam member in a manner such that (1) said cam member opens said first swtich upon movement of the one guide member into abutting relation with the spindle member of the take-up device and (2) said cam member opens said second switch upon movement of the one guide member into abutting relation with the outermost convolution of a predetermined length of strip material wound onto a hub received on the spindle member.

* * * * *